United States Patent [19]

Stattel et al.

[11] 4,435,781
[45] Mar. 6, 1984

[54] MEMORY-BASED PARALLEL DATA OUTPUT CONTROLLER

[75] Inventors: Raymond J. Stattel, Lanham; James K. Niswander, Silver Spring, both of Md.

[73] Assignee: The United States of America as represented by the Administrator of the National Aeronautics and Space Administration, Washington, D.C.

[21] Appl. No.: 501,060

[22] Filed: Jun. 9, 1983

Related U.S. Application Data

[63] Continuation of Ser. No. 128,230, Mar. 7, 1980, abandoned.

[51] Int. Cl.³ .............................................. G06F 3/00
[52] U.S. Cl. .................................................... 364/900
[58] Field of Search ............................... 364/200, 900

[56] References Cited

U.S. PATENT DOCUMENTS 3,742,466 6/1973 Hamm ................................. 364/900
4,016,549 4/1977 Hutner ................................ 364/900

Primary Examiner—James D. Thomas
Assistant Examiner—David Y. Eng
Attorney, Agent, or Firm—Ronald F. Sandler; John O. Tresansky; John R. Manning

[57] ABSTRACT

A memory-based parallel data output controller employs associative memories and memory mapping to decommutate multiple channels of telemetry data. The output controller contains a random access memory (RAM) (10) which has at least as many address locations as there are channels. A word counter addresses the RAM (10) which provides as its outputs an encoded peripheral device number and a MSB/LSB-first flag. The encoded device number and a bit counter address a second RAM (20) which contains START and STOP flags to pick out the required bits from the specified word number. The LSB/MSB, START and STOP flags, along with the serial input digital data go to a control block (30) which selectively fills a shift register (40,42) used to drive the parallel data output bus (32). A strobe pulse is also generated which enables a decoder (34) to select the appropriate peripheral device using the encoded device number. A microcomputer connected to an address bus (16) can be used to set the contents of the RAMs via multiplexers (14,24) during the initialization phase using the technique of memory mapping.

3 Claims, 4 Drawing Figures

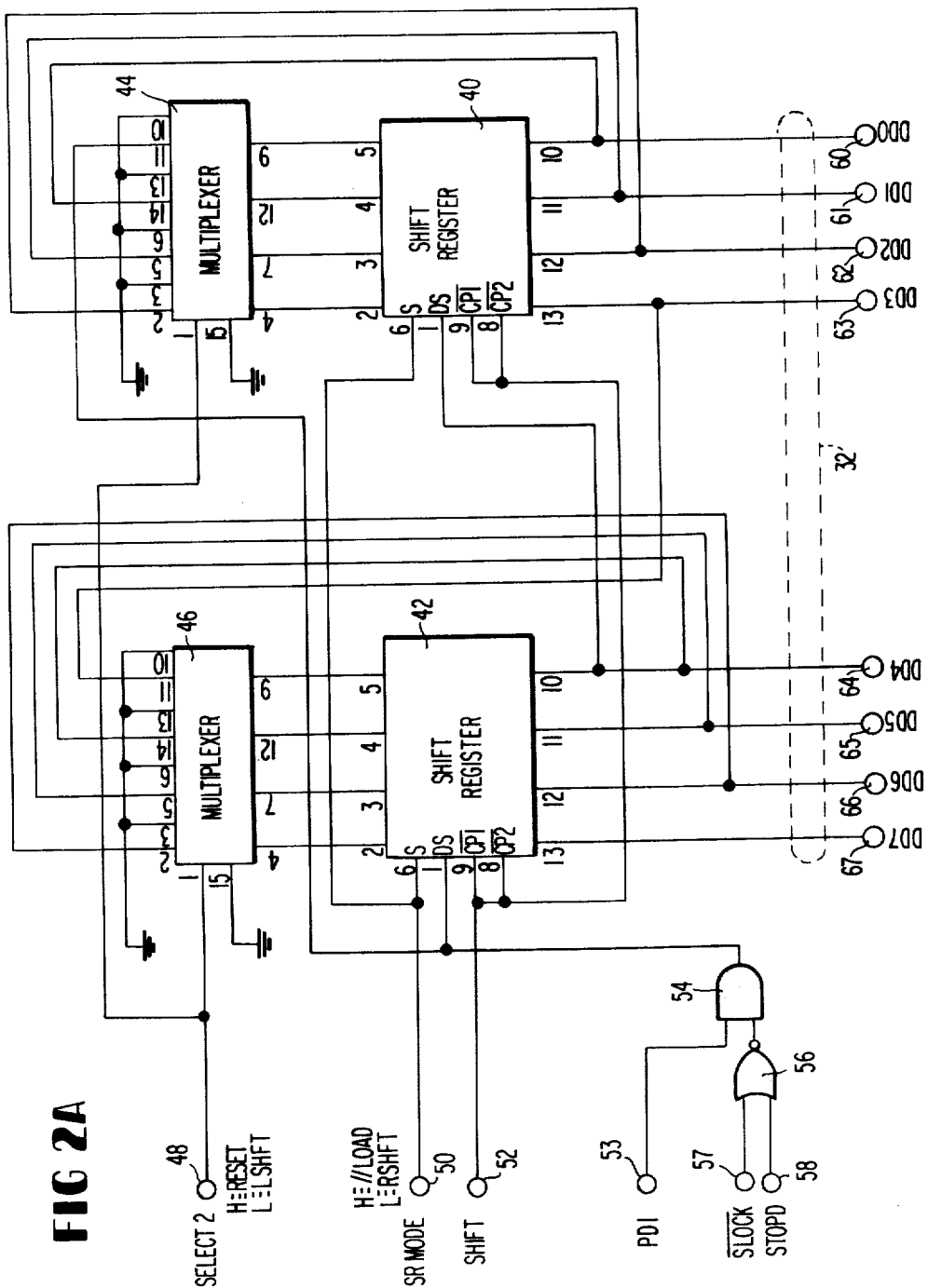

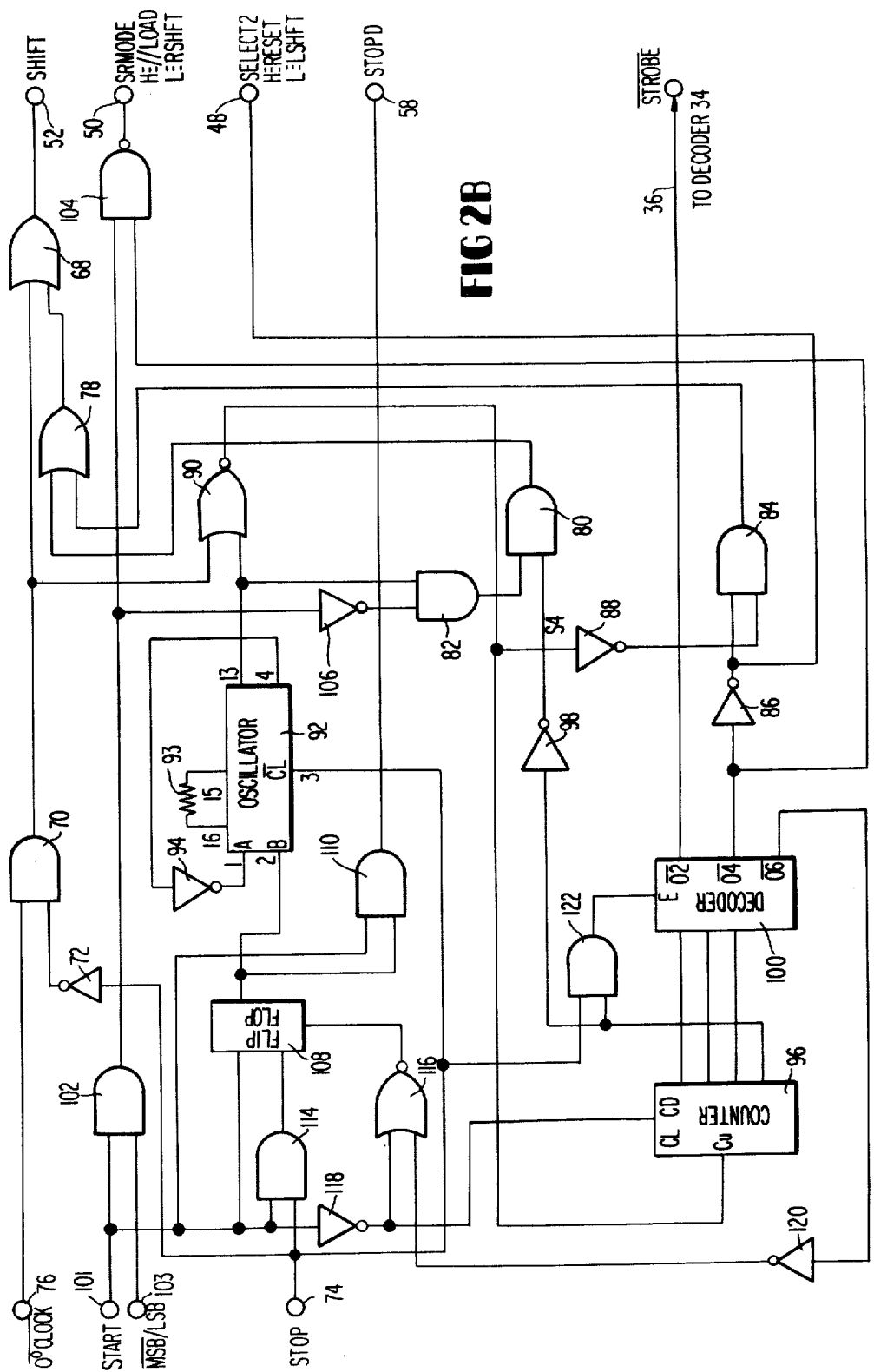

MEMORY-BASED PARALLEL DATA OUTPUT CONTROLLER

ORIGIN OF THE INVENTION

The invention described herein was made by employees of the United States Government and may be manufactured and used by or for the government for governmental purposes without the payment of royalties thereon or therefor.

This application is a continuation of application Ser. No. 128,230, filed Mar. 7, 1980 now abandoned.

TECHNICAL FIELD

The present invention generally relates to a system for decommutating serial digital data, and more particularly to the use of associative memories and memory mapping to decommutate multiple channels of digital data.

BACKGROUND ART

In a serial telemetry data link, one method of encoding the data is to group data words into logical units preceded by a link synchronization data word, which logical units are called frames. A particular format may consist of a fixed number of frames which are collectively called a paragraph, each frame being a subframe of the paragraph. In order to make meaningful use of data at the receiving node in a network, it is necessary to know the transmitted data format or at least the location of the data words of particular interest. Next it is necessary to have equipment which can extract or decommutate the particular data words from all the others in the data stream.

In the past, systems used to decommutate serial digital data and control the data output to multiple peripheral devices made extensive use of comparator circuits to test a desired data word address versus the real time data word address. Generally, this means a comparator circuit and a latched reference register are required for each data word request. Alternatively, one comparator may be used with extensive multiplexing of one input. The selection of data as either most significant bit (MSB) or least significant bit (LSB) first is implemented by a switch or patch panel and defines the order of all data to be delivered to the peripheral devices. Similarly, the number of bits and location of the data word is usually either set for all devices or is set by switches or a patch panel for each device. Previous use of computers has been confined to setting up latched registers for comparator test (hardware or software) reference and setting MSB/LSB or other control parameters which determined the mode of operation of the entire decommutator.

The prior art decommutation systems have several disadvantages. Usually the selection of bit strings within a data word is not available. The selection of MSB or LSB interpretation of data words applied to all data words. Real time alteration of data word requests is generally available only with a significant increase in hardware.

It is therefore an object of the present invention to provide a decommutation system wherein the complete configuration of the decommutation information can be changed in real time to accommodate dynamic requirements.

It is another object of the invention to provide a decommutation system wherein any data word requested by any peripheral device can be either MSB or LSB first and any sequence of consecutive bits in a data word or overlapping more than one data word can be selected for any peripheral device.

STATEMENT OF THE INVENTION

According to the present invention, a memory-based parallel data output controller is provided which selects predetermined consecutive bit strings from a formatted serial data stream and directs the parallel output plus a strobe signal to a specified peripheral device. The output controller contains a random access memory (RAM) which has at least as many address locations as the number of words in a paragraph, for example. A word counter input from a frame synchronizer addresses the RAM which provides as its outputs an encoded peripheral device number and a MSB/LSB-first flag. The encoded device number and the bit counter from the frame synchronizer are supplied to address lines of another RAM which contains START and STOP flags to pick out the required bits from the specified word number. The MSB/LSB, START and STOP flags, along with the serial input digital data go to a control block which selectively fills a shift register used to drive the parallel data output bus. A strobe pulse is also generated which enables a decoder to select the appropriate peripheral device using the encoded device number. A microcomputer can be used to set the contents of the RAMs during the initialization phase using the technique of memory mapping. After the RAMs are loaded, the output controller operates completely independently of the microcomputer. The speed of operation is limited only by the access times required for operation of the memories.

BRIEF DESCRIPTION OF THE DRAWINGS

The specific nature of the invention, as well as other objects, aspects, uses and advantages thereof, will clearly appear from the following description with reference to the accompanying drawings, in which:

FIGS. 2A and 2B are logic diagrams of the shift register and control circuit, respectively, used in the controller shown in FIG. 1.

DETAILED DESCRIPTION OF THE INVENTION

The preferred embodiment of the invention is described in terms of a system which decommutates multiple channels of telemetry data to a plurality of digital-to-analog converters (DACs). Such a system is useful, for example, in a multi-channel digital voice communications system. Those skilled in the art will, however, recognize that the invention has broad general utility and that the environment in which it is described is by way of example only.

Communications systems of the type described employ at the receiving end a bit synchronizer and a frame synchronizer, both of which are well known in the art. The bit synchronizer provides an NRZ-L DATA signal and a O°CLOCK signal, a high level of the NRZ-L DATA signal at the high-to-low transition of the O°-CLOCK being interpreted as a binary "1" while a low level at that time is interpreted as a binary "0". The frame synchronizer includes, among other things, a bit counter which counts the O°CLOCK signal and a word counter which counts a decoded output of the bit counter. A decoder connected to the output of the bit counter detects when the number of bits counted equals a data word and provides an output pulse which resets the bit counter. The word counter counts the number of times the bit counter is reset, and decoders connected to the word counter detect when the number of words counted equal a frame and/or a paragraph. In the embodiment described, the O°CLOCK signal from the bit synchronizer and the outputs from the bity counter and the frame counter are used as inputs to the parallel data output controller. However, neither the bit synchronizer nor the frame synchronizer form part of the present invention and, therefore, will not be described further.

Figure 1:
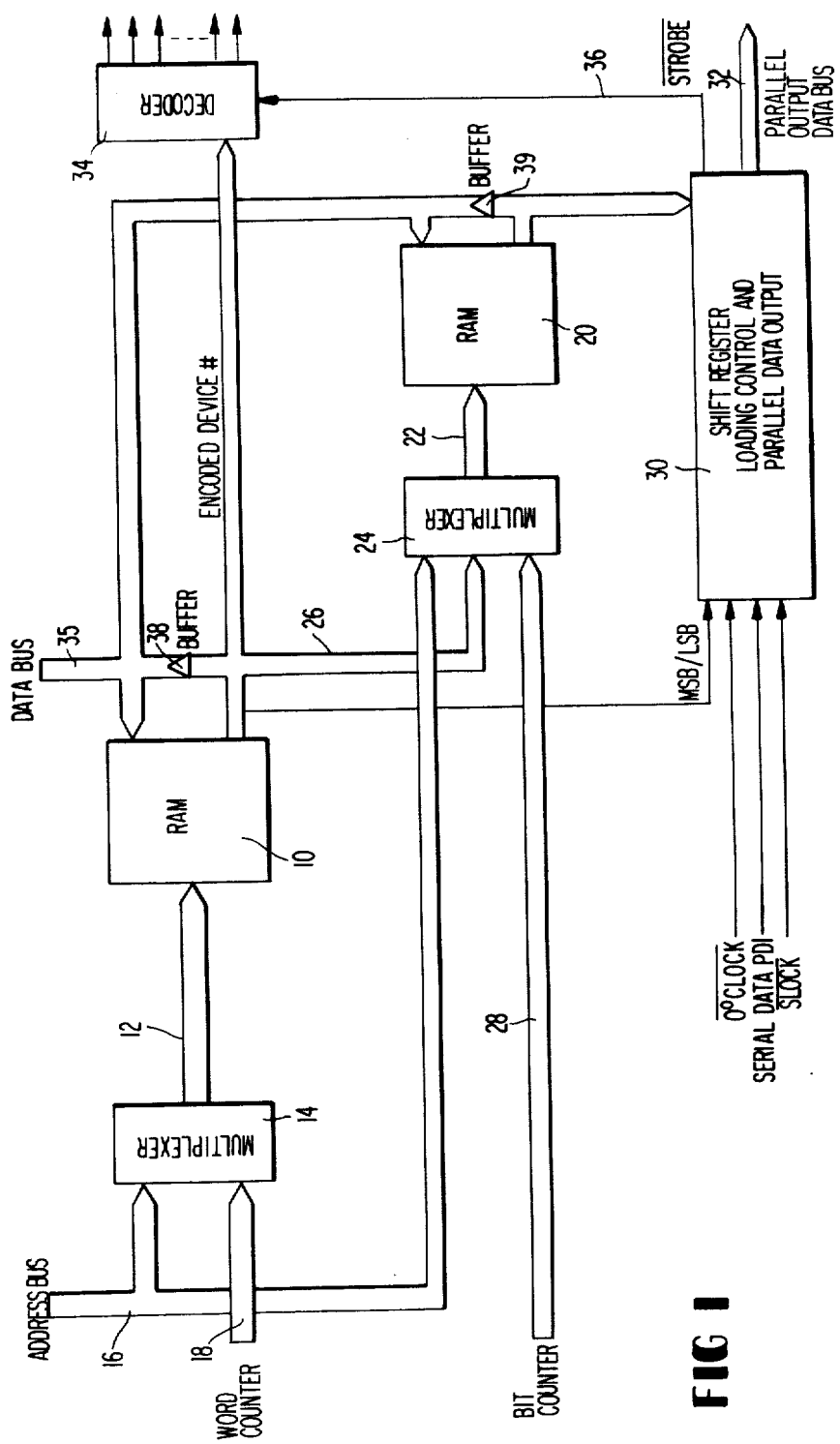
FIG. 1 is a block diagram of the memory-based parallel data output controller according to the invention.

Referring now to the drawings, and more particularly to FIG. 1, the decommutation memory block of the parallel data output controller according to the invention consists of a random access memory (RAM) 10. This RAM may be composed of, for example, seven INTEL 2102 RAM integrated circuits. The data bits stored in these seven RAMs are distributed as follows: 5-bits for the digital-to-analog converter (DAC) identification number (allowing for up to 32 DACs), 1-bit for bit order (MSB or LSB first), and 1-bit for the identification ENABLE. The ten address lines 12 to the RAM 10 come from a 10-wide, 2-to-1 multiplexer 14. The multiplexer 14 can be built from three 4-wide, 2-to-1 74LS257 integrated circuits. One input of multiplexer 14 is connected to a 10-wide address bus 16 accessible by a data processing device such as a microcomputer, for example, while the other input of multiplexer 14 is connected to a paragraph word counter in a frame synchronizer by ten parallel lines 18. Except during the setup of bit patterns in the RAM 10 when the address lines 12 are switched to the address bus 16, the address lines are driven by the output on lines 18 from the paragraph word counter. As a requested data word index value appears on the address lines 12, the DAC identification number, bit order and identification ENABLE appear at the outputs of RAM 10. In other words, the RAM 10 is used to detect certain combinations of bits on its address lines rather than as a usual data storage and retrieval medium.

A second memory block consists of RAM 20 and may also be composed of INTEL 2102 RAM integrated circuits. This memory block, however, is only two bits wide for START and STOP flags, and so only two INTEL 2102 RAM integrated circuits are required. The address lines 22 for RAM 20 come from another 10-wide, 2-to-1 multiplexer 24, which may also be composed of three 74LS257 integrated circuits. One input of multiplexer 24 is connected to the 10-wide address bus 16. The other input to multiplexer 24 is also 10-bits wide, but the five most significant bits of this input are connected to the DAC identification number output lines 26 from RAM 10, while the five least significant bits of the input are connected to lines 28 from the word bit counter of a frame synchronizer. Except during the START and STOP bit pattern setup time when the address lines 22 are connected to the address bus 16, the address lines 22 of the RAM 20 are normally connected to output lines 26 of RAM 10 and bit counter lines 28. As a DAC identification number and word bit count appear on the address lines 22, the START and STOP flags appear at the outputs of RAM 20. Again, the RAM 20 is used to detect certain combinations of bits on its address lines rather than as a usual data storage and retrieval medium.

The outputs of RAMs 10 and 20 are connected to three-state buffers 38 and 39, respectively, which may be composed of 74LS365 integrated circuits. The buffers are in turn connected to the data bus 35 of the microcomputer. The controller has an initialize mode and an operate mode. During the initialize mode, the buffers 38 and 39 are in their high impedance state, thereby isolating the outputs of RAMs 10 and 20 from the data bus 35. The data bus 35 is connected to the RAMs 10 and 20 and is used in the initialize mode to enable the RAMs to write data supplied via the address bus 16 into the RAMs. During the operate mode, the buffers 38 and 39 provide outputs representing binary "1"s and "0"s according to the outputs of RAMs 10 and 20, respectively. In this way, the microcomputer can monitor the outputs of the RAMs on data bus 35.

The shift register control circuitry 30 takes the START and STOP flags from RAM 20, the MSB/LSB flag from RAM 10, the O'CLOCK signal, serial data PD1 and a SLOCK signal from a frame synchronizer in order to select and align the requested number of bits from any data word. The output data from the shift register is provided on an 8-bit wide bus 32 to the remotely located DACs, each of which are provided with latches. A 5-line-to-32-line decoder 34 receives the DAC identification number from RAM 10 and a strobe on line 36 from shift register control circuitry 30 and directs the strobe to the corresponding DAC. The decoder 34 may be made of two Fairchild 93L11 4-line-to-16-line decoders.

The 8-bit shift register is shown in FIG. 2A and includes two 74LS95B 4-bit shift registers integrated circuits 40 and 42 and two 74LS257 multiplexer integrated circuits 44 and 46 to allow left and right shift capability. More specifically, input terminal 48 connected to the number 1 pins of multiplexers 44 and 46 receives a signal identified as SELECT2. When this signal is low, the shift register will shift left; a high level of this signal is a reset. Input terminal 50 connected to pins 6 of shift registers 40 and 42 receives a signal identified as SRMODE. When this signal is low, the shift register will shift right; a high level of this signal denotes parallel load. Shift pulses are supplied to terminal 52 which is connected to pins 8 and 9 of shift registers 40 and 42. The serial data PD1 at terminal 53 is supplied via AND gate 54 to pin 1 of shift register 42 and pin 11 of multiplexer 44. AND gate 54 is enabled by the output of NOR gate 56 which receives as inputs the SLOCK signal at terminal 57 from the frame synchronizer and a signal at terminal 58 identified as STOPD. This latter signal, as well as the signals at terminals 48, 50 and 52, is generated by the logic circuitry shown in FIG. 2B. The outputs of shift registers 40 and 42 to terminals 60 and 67 comprise the parallel output data bus 32.

Figure 3:
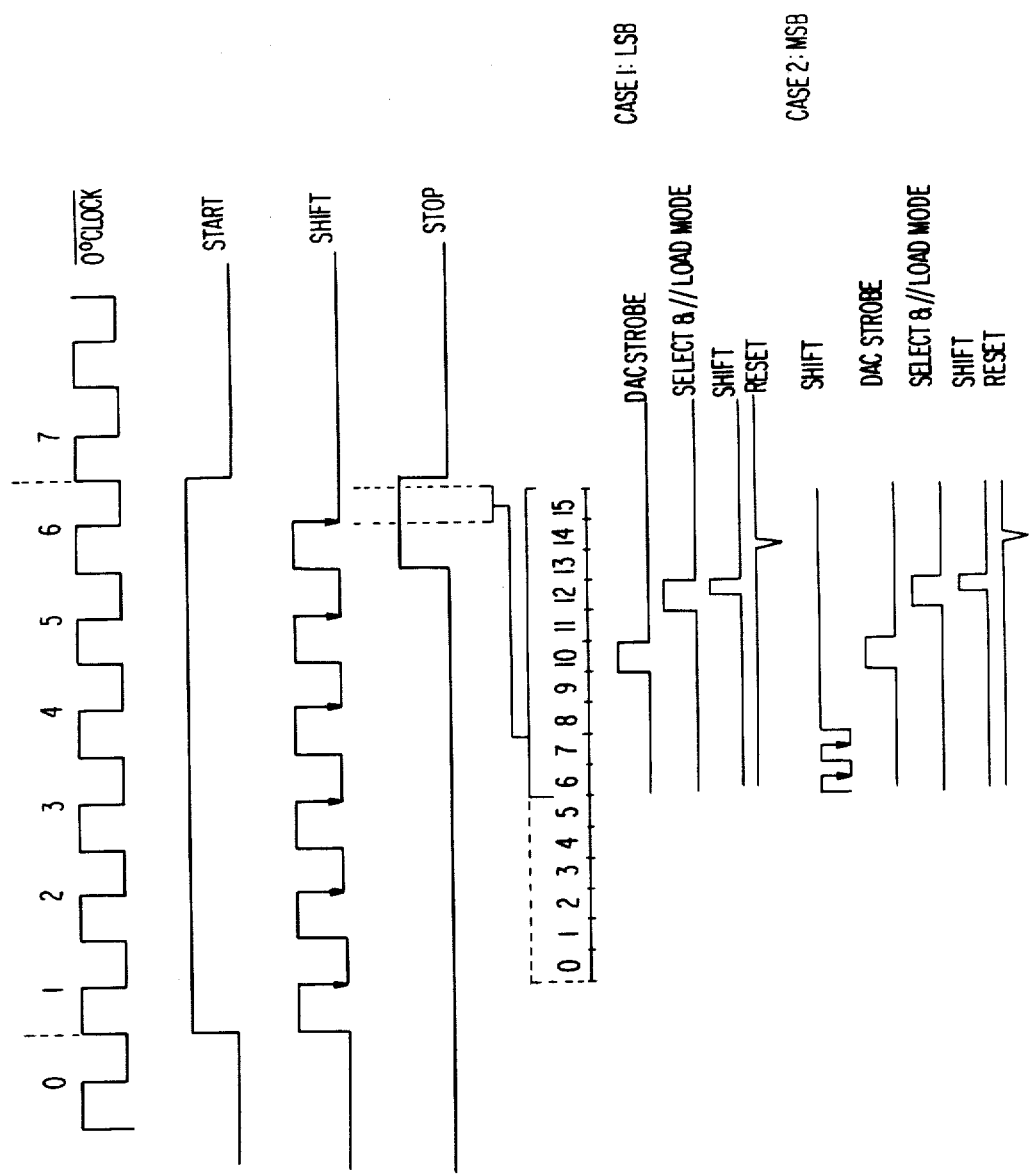
FIG. 3 is a timing diagram illustrating the timing shift register and control circuit shown in FIGS. 2A and 2B.

Turning now to the logic circuit shown in FIG. 2B, the SHIFT signal at terminal 52 is supplied by OR gate 68, one input of which is connected to the output of AND gate 70. The AND gate 70 is enabled by the output of inverter 72 which receives the STOP flag from terminal 74, this flag being generated by RAM 20. In other words, AND gate 70 is enabled by a $\overline{STOP}$ signal. The other input to AND gate 70 is connected to terminal 76 to which is supplied the O°CLOCK signal as shown in FIG. 3.

The second input of OR gate 68 is connected to the output of OR gate 78 which in turn has two inputs. One of these inputs is supplied by AND gate 80 which is enabled by the output of AND gate 82. The other one of the inputs is supplied by AND gate 84 which is enabled by the output of inverter 86. The output of inverter 86 is also supplied to terminal 48 as the SELECT 2 signal. The second input to AND gate 84 is supplied by inverter 88 connected to the output of NOR gate 90. In other words, the combination of NOR gate 90 followed by inverter 88 performs an OR functin. One input or NOR gate 90 is connected to the output of AND gate 70, while the other input of NOR gate 90 is connected to the output of oscillator 92. Oscillator 92 may be composed of a 74LS123 integrated circuit having a timing resistor 93 connected between pins 15 and 16 and an inverter 94 connected between pins 4 and 1. The output of oscillator 92 is also connected to one input of AND gate 82.

The output of NOR gate 90 is connected to the input of counter 96 which may be composed of a 74LS193 integrated circuit which is a four stage counter. The output of the last stage of the counter 96 is supplied to inverter 98 which enables AND gate 80. The outputs of the first three stages of counter 96 are supplied to the inputs of a binary-to-decimal decoder 100 which may be composed of a 74LS138 integrated circuit. The $\overline{02}$ output of decoder 100 is the $\overline{STROBE}$ signal supplied to decoder 34 on line 36. The $\overline{04}$ output of decoder 100 is supplied to inverter 86 which enables AND gate 84.

The START flag from RAM 20 is applied to terminal 101 which is connected to one input of AND gate 102. The other input of AND gate 102 is connected to terminal 103 which receives the MSB/LSB flag from RAM 10. The output of AND gate 102 is connected to one input of NAND gate 104 the output of which is connected to terminal 50 to supply the SRMODE signal to shift registers 40 and 42. The other input of NAND gate 104 is connected to the $\overline{04}$ output of decoder 100. The output of AND gate 102 is also connected to inverter 106, the output of which is connected to one input of AND gate 82 which passes the output of oscillator 92 to shift terminal 52 via AND gate 80 and OR gates 78 and 68.

Terminal 101 is also connected to one input of D-type flip-flop 108 which may be composed of a 74LS74 integrated circuit. The Q output of flip-flop 108 enables AND gate 110 which has its other input connected to terminal 101. The output of AND gate 110 is connected to terminal 58 and is identified as the STOPD signal to NOR gate 56. The other input to flip-flop 108 is supplied by the output of AND gate 114. This AND gate has inputs connected to terminals 101 and 74. Flip-flop 108 is reset by the output of NOR gate 116. One input to NOR gate 116 is supplied by inverter 118 connected to terminal 101, and the other input is supplied by inverter 120 connected to the $\overline{06}$ output of decoder 100. The output of inverter 118 is also used to reset counter 96.

Terminal 74 is also connected to pin 3 of oscillator 92 and to one input of AND gate 122. The other input of AND gate 122 is connected to the last stage of counter 96, and the output of AND gate 122 is connected to enable decoder 100.

With reference to the timing diagram shown in FIG. 3, processing begins when the START flag from RAM 20 is high or logic "1". If the bit order specified by RAM 10 is LSB first, i.e., the MSB/LSB flag is high, then SRMODE at terminal 50 is low which means that the 8-bit shift register will be shifting from left to right. It should be noted that in the LSB-first case, no additional shifting of the input data is necessary in order to achieve maximum excursion of the 8-bit result. In other words, the 8-bit result is by its nature left aligned.

Continuing with the description of the LSB-first case shown in CASE 1 in FIG. 3, the SHIFT signal at terminal 52 is generated by AND gate 70. The shift register takes in the new data bit on the falling edge of the SHIFT signal. The STOP flag from RAM 20 will go high to identify the final bit to be shifted into the shift register and to initiate a sequence of control signals. On the rising edge of the STOP flag, the Q output of flip-flop 108 goes high which causes the STOPD signal at terminal 112 to go high and also enables the oscillator 92. In the LSB case, the STOPD signal has no significance. Also in the LSB case, the output of AND gate 82 remains low so that no additional SHIFT pulses are generated. As the output of AND gate 70 goes low causing the final bit to be shifted in, NOR gate 90 passes the output of oscillator 92 to counter 96 which begins counting on each rising edge of the oscillator pulses.

The discrete control sequence signals are generated by decoder 100 which is enabled after the eighth clock input to counter 96. Referring to the timing diagram shown in FIG. 3, note that the DAC STROBE signal occurs during counter period 10. During period 23, the SRMODE signal is forced high to prepare the shift register for a parallel load, and the SELECT2 signal goes high to select zero data from multiplexers 44 and 46. The output of AND gate 84 is high during the last half of counter period 12, and its falling edge generates a SHIFT signal to load the shift register with zero data in preparation for the next START-STOP data request sequence. Finally, a reset pulse is sent during counter period 14 to reset flip-flop 108 which releases the STOPD signal and stops oscillator 92.

In the event of a MSB-first request illustrated as CASE 2 in FIG. 3, there are some important differences. At the occurrence of a START flag, the SRMODE signal is held high which puts the shift register in a shift-left mode. On the occurrence of the trailing edge of the output of AND gate 70, the shift register takes in a new data bit from the right side and counter 96 is incremented. After the last bit is shifted in, during the last half of the STOP flag, oscillator 92 is started to generate enough additional shifts at the output of AND gate 82 to left-align the data word. The additional bits shifted in are zero due to the STOPD signal which inhibits the output of AND gate 54. The last additional shift, if necessary, occurs during counter period 7. From the counter period 8 on, further data shifting is inhibited by the output of inverter 98.

In either CASE 1 or CASE 2, if link synchronization represented by the $\overline{SLOCK}$ signal input to NOR gate 56 is lost, all output data is forced to zero. In other words, when link synchronization is lost, the $\overline{SLOCK}$ signal goes high to inhibit the output of AND gate 54.

The specific embodiment of the invention illustrated in FIGS. 1 and 2 is capable of providing 32 8-bit output channels. The number and resolution of the channels is, however, merely exemplary. The important feature of the invention is the use of associative memories and memory mapping to decommutate multiple channels of telemetry data. Each data request can be specified as having MSB-first or LSB-first bit order, the specification of bit order being on telemetry word boundaries. Data selection for the output channels can be modified by an interactive program either by specifying single new assignments or by requesting a previously defined set of assignments. The memory-based parallel data controller according to the invention is a general interface element to any peripheral device which accepts parallel data. For example, it can be used to drive light emitting diode (LED) displays, numeric displays, printers, plotters, and parallel output ports as well as digital-to-analog converters (DACs).

We claim:

1. A memory-based parallel data output controller for the extraction of predetermined bits from an inputted bit serial digital data stream for use with a frame synchronizer of the type having a word counter, a bit counter, a link synchronization status signal and a reference clock, said output controller receiving said inputted bit serial digital data stream and decommutating said predetermined extracted bits into multiple channels of predetermined parallel telemetry data to a plurality of peripheral devices, comprising:

a first random access memory having address lines and at least as many memory address locations as there are channels, said word counter being connected to said address lines of said first random access memory which provides as its output an encoded peripheral device number and a first flag denoting either most significant bit or least significant bit first operation, a second random access memory having address lines and for outputting second and third flags to pick out the start and stop of said predetermined extracted bits, said encoded peripheral device number output from said first random access memory and said bit counter being connected to the address lines of said second random access memory, a serial-in parallel-out shift register for outputting said predetermined extracted bits in a parallel format representing said parallel telemetry data, shift register control means for receiving said bit serial digital data stream, said first, second and third flags, said link synchronization status signal and said reference clock and, therefrom, for developing and outputting a strobe pulse, a mode pulse, a shift pulse, and serial data pulse stream all of which output pulses being inputted into said shift register, decoding means connected to receive said encoded peripheral device number output from said first random access memory and receiving and being enabled by said output strobe pulse for selecting one of said plurality of peripheral devices to receive said parallel telemetry data from said shift register.

2. A memory-based parallel data output controller as recited in claim 1 further comprising:

a first multiplexer having two sets of inputs, one set being connected to said word counter and the other set being connected to an address but accessible by a data processing device, the output of said first multiplexer being connected to the address lines of said first random access memory, and a second multiplexer having two sets of inputs, a part of one set being connected to said encoded peripheral device number output from said first random access memory and the remaining part being connected to said bit counter, the other set of inputs being connected to said address bus, the outputs of said second multiplexer being connected to the address lines of said second random access memory, said data processing device being used to set the contents of said first and second random access memories using the technique of memory mapping.

3. A memory-based parallel data output controller as recited in claim 2 further comprising means connected to said frame synchronizer for forcing the output of said parallel data output controller to zero in the event that frame synchronization is lost.

* * * * *